US012760129B2

(12) United States Patent
He et al.

(10) Patent No.: US 12,760,129 B2
(45) Date of Patent: Oct. 13, 2026

(54) OLEOPHOBIC FLUOROPOLYMERS AND FIBROUS MATERIALS PREPARED THEREFROM

(71) Applicant: ENTEGRIS, INC., Billerica, MA (US)

(72) Inventors: Mei Feng He, Hangzhou (CN); Dongzhu Wu, Hangzhou (CN); Yunjia Xia, Hangzhou (CN); Kwok-Shun Cheng, Nashua, NH (US)

(73) Assignee: Entegris, Inc., Billerica, MA (US)

( * ) Notice: Subject to any disclaimer, the term of this patent is extended or adjusted under 35 U.S.C. 154(b) by 1061 days.

(21) Appl. No.: 17/847,077

(22) Filed: Jun. 22, 2022

(65) Prior Publication Data

US 2023/0025277 A1 Jan. 26, 2023

Related U.S. Application Data

(63) Continuation of application No. PCT/CN2021/102860, filed on Jun. 28, 2021.

(51) Int. Cl.

*C08F 2/26* (2006.01)
*C08F 220/18* (2006.01)
*C08F 220/24* (2006.01)
*D04H 1/435* (2012.01)

(52) U.S. Cl.

CPC .......... *C08F 2/26* (2013.01); *C08F 220/1804* (2020.02); *C08F 220/24* (2013.01); *D04H 1/435* (2013.01); *D10B 2331/04* (2013.01); *D10B 2403/0122* (2013.01); *D10B 2505/04* (2013.01)

(58) Field of Classification Search

None

See application file for complete search history.

(56) References Cited

U.S. PATENT DOCUMENTS

| | | | |
|---|---|---|---|
| 4,365,049 | A | 12/1982 | Tsunoda |
| 4,686,168 | A | 8/1987 | Fujii |
| 5,342,434 | A | 8/1994 | Wu |
| 5,869,590 | A | 2/1999 | Clark |
| 5,962,584 | A | 10/1999 | Dougherty |
| 6,028,155 | A | 2/2000 | Collins |
| 6,355,081 | B1 | 3/2002 | Wang |
| 6,646,043 | B2 | 11/2003 | Funaki |
| 7,125,941 | B2 | 10/2006 | Kaulbach |
| 8,088,455 | B2 | 1/2012 | Koga |
| 8,785,556 | B2 | 7/2014 | Brown |
| 9,260,553 | B2 | 2/2016 | Hintzer |
| 9,926,662 | B2 | 3/2018 | Shimada |
| 2002/0144595 | A1 | 10/2002 | Wang |
| 2008/0015304 | A1 | 1/2008 | Hintzer |
| 2011/0160415 | A1 | 6/2011 | Marchionni |
| 2011/0178260 | A1 | 7/2011 | Peng |
| 2018/0230245 | A1 | 8/2018 | Musio |
| 2019/0375946 | A1 | 12/2019 | Jana |
| 2020/0247922 | A1 | 8/2020 | D'Aprile |
| 2020/0377627 | A1 | 12/2020 | Lin |
| 2021/0079560 | A1 | 3/2021 | Shenoy |
| 2021/0095054 | A1 | 4/2021 | Yoshida |

FOREIGN PATENT DOCUMENTS

| | | | | | |
|---|---|---|---|---|---|
| CN | 103572604 | B | | 1/2016 | |
| CN | 107129561 | A | | 9/2017 | |
| CN | 106967191 | B | | 11/2019 | |
| CN | 109422850 | B | | 7/2021 | |
| CN | 108587381 | B | | 9/2021 | |
| EP | 890592 | A | | 1/1999 | |
| EP | 907507 | A | | 4/1999 | |
| EP | 1922340 | B1 | | 12/2016 | |
| GB | 2322330 | B | | 10/1998 | |
| JP | 2013136686 | A | | 7/2013 | |
| JP | 2019101250 | A | * | 6/2019 | |
| WO | WO-03062347 | A1 | * | 7/2003 | ............ D06M 15/53 |
| WO | 2014021106 | A1 | | 2/2014 | |
| WO | 2019236533 | A1 | | 12/2019 | |

OTHER PUBLICATIONS

KAO Emulgen 430 Product Specification Sheet. (Year: none).*

O'Driscoll, "Ultrasonic Homogenizers Versus High Pressure Homogenizers". (Year: 2021).*

Machine translation, JP2019101250A. (Year: 2019).*

Liu, Hongzhu, et al., Synthesis and Characterization of Waterborne Fluoropolymers Prepared by the One-Step Semi-Continuous Emulsion Polymerization of Chlorotrifluoroethylene, Vinyl Acetate, Butyl Acrylate, Veova 10 and Acrylic Acid, Molecules, 2017, 1-12, 22, 184, doi:10.3390/molecules22010184, www.mdpi.com/journal/molecules.

* cited by examiner

*Primary Examiner* — Catherine S Branch

(57) ABSTRACT

The disclosure provides a process for preparing an oleophobic fluoropolymer emulsion. The resulting fluoropolymer emulsion has excellent hydrophobic and oleophobic modification ability (as coatings) on polyester fibers such as polyester (PET), polypropylene (PP) and woven and nonwoven fabrics. Accordingly, the woven and nonwoven materials so coated are useful in venting filter applications.

17 Claims, No Drawings

OLEOPHOBIC FLUOROPOLYMERS AND FIBROUS MATERIALS PREPARED THEREFROM

CROSS-REFERENCE TO RELATED APPLICATIONS

This application is a continuation application under 35 U.S.C. 111(a) claiming priority under 35 U.S.C. 120 to International Application No. PCT/CN2021/102860, filed Jun. 28, 2021, the disclosure of which is incorporated herein by reference in its entirety.

TECHNICAL FIELD

The disclosure relates to methodology for preparing oleophobic emulsion polymers, which are useful in imparting oleophobic coatings to fibrous materials such as woven and nonwoven materials which can then form a portion of a filter.

BACKGROUND

Due to their relatively low surface free energy, certain fluoropolymers have been widely used as hydrophobic and oleophobic modification additives in the paper and fibers industry. There are two types of fluoropolymer products in the market—one is a solution polymer, prepared by a free radical polymerization in an organic solvent and the other is an emulsion polymer. In the case of the solution polymer, a large amount of solvent is generally necessary during the polymerization and subsequent utilization of these types of fluoropolymers, thus contributing to safety and environmental concerns. In the case of fluorine-containing emulsion polymers, non-fluorinated surfactants are often employed in the polymerization reaction. However, due to the low surface free energy and strong hydrophobicity of fluorinated monomers, it is inherently difficult to emulsify fluorinated monomers with common non-fluorinated surfactants. As a result, even with high concentrations of surfactant, the fluorinated monomers are still unable to be completely emulsified and polymerized, thereby resulting in an unstable polymer product with low fluorine content and poor hydrophobic and oleophobic modification ability. While fluorine-containing surfactants are generally more effective at reducing the surface tension of water than their non-fluorinated counterparts, such fluorine-containing surfactants are environmentally persistent and are thus disfavored due to the potential for bioaccumulation in humans and wildlife.

Thus, a need exists for improved methodology for the preparation of emulsion-type fluoropolymers and for improved fluoropolymers per se, for use, for example, in the paper and textile industries and in filtration.

SUMMARY

In summary, the disclosure provides a process for preparing a fluoropolymer emulsion. The resulting fluoropolymer emulsion has excellent hydrophobic and oleophobic modification ability (as coatings) on polyester fibers such as polyester (e.g., PET) and polypropylene (PP) woven and nonwoven fabrics. In the method of this disclosure, the fluorinated monomer(s) and non-fluorinated monomer(s) can be fully emulsified even with low levels of non-fluorinated surfactants by controlling the intensity and time (duration) of an ultrasonic pre-emulsification step. The relative amounts of the non-fluorinated monomers to fluorinated monomers may be manipulated to reach an optimum solubility in aqueous solutions for in-process fluorinated monomers, as well as adjusting the desired overall fluorine content in the resulting emulsion polymer. The resulting fluoropolymer emulsion has high fluorine content and excellent stability. This fluoropolymer emulsion can be used to coat polymeric fibers, woven, and nonwoven materials made therefrom, such as polypropylenes, polyethylenes, polyesters such as poly(ethylene terephthalate), halogenated polyolefins such as poly(tetrafluoroethylene), and other nonwoven fabrics; these materials so coated show excellent oleopophobicity and hydrophobicity after modification upon dip-coating or spray coating with the fluoropolymer emulsion. Accordingly, the woven and nonwoven materials so coated are useful in filter venting applications. The experimental results show that the treated PET nonwoven material can reach an oleophobic level of 6 or above, (according to the AATCC-118-1997 oil repellency test method) with a low air flux loss.

DETAILED DESCRIPTION

As used in this specification and the appended claims, the singular forms “a”, “an”, and “the” include plural referents unless the content clearly dictates otherwise. As used in this specification and the appended claims, the term “or” is generally employed in its sense including “and/or” unless the content clearly dictates otherwise.

The term “about” generally refers to a range of numbers that is considered equivalent to the recited value (e.g., having the same function or result). In many instances, the term “about” may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

In a first aspect, the disclosure provides a process for preparing a fluoropolymer emulsion, comprising the aqueous free-radical polymerization of monoethylenically-unsaturated monomers, by combining components comprising:

a. greater than 60 to about 100 weight percent of a fluorine-containing monoethylenically-unsaturated monomer;

b. less than 40 weight percent of a fluorine-free monoethylenically-unsaturated monomer; and c. a surfactant, wherein the total of a. and b. is 100 weight percent, thereby providing a mixture, and wherein the mixture is subjected to ultrasonic vibration at an intensity and for a period of time sufficient to form a pre-emulsion, followed by subjecting the mixture to free-radical polymerization conditions and allowing the polymerization to proceed to a desired end point.

In this process, the emulsifier (surfactant) is combined with water, the fluorine-containing monoethylenically-unsaturated monomer and the monoethylenically-unsaturated monomer and is emulsified using high frequency vibration as applied to the reaction mixture. In one embodiment, this high-frequency vibration is ultrasonic vibration. In one embodiment, the vibration is at about 20,000 Hz to about 100,000 Hz. As used herein, free-radical polymerization conditions refer to those conditions known to one of ordinary skill in the art. The reaction is generally conducted at a temperature at or above room temperature, for example from about 1 hour to about 24 hours, at about 40° C. to about 100° C. Additionally, such free-radical polymerization conditions also comprise those conditions where a desired quantity of free radical flux is generated in the reaction mixture to effect polymerization of the fluorine-containing and fluorine-free monomers. Such free radicals can be generated in solution via application of appropriate thermal means or irradiation such as, for example, ultraviolet radiation or electron beam radiation. Alternatively, and advantageously, the free-radical flux may be affected by initiators known to those skilled in the art of free-radical polymerization. In one embodiment, such initiators can be chosen from hydrogen peroxide, potassium peroxydisulfate, ammonium peroxydisulfate, potassium persulfate, sodium persulfate, ammonium persulfate, dibenzoyl peroxide, lauryl peroxide, di-tertiary butyl peroxide, 2,2'-azobisisobutyronitrile (or 2,2'-azobis(2-methylpropionitrile)—also known as AIBN), t-butyl hydroperoxide, azodiisobutylamidine hydrochloride, and benzoyl peroxide. In one embodiment, the initiator is utilized in an amount of about 0.05 weight to about 5 weight percent, based on the total weight of monomers.

Thus, in another embodiment, the disclosure provides the process of the first aspect, which comprises combining:

a. greater than 60 to about 100 weight percent of a fluorine-containing monoethylenically-unsaturated monomer;
b. less than 40 weight percent of a fluorine-free monoethylenically-unsaturated monomer; and
c. a surfactant, wherein the total weight percent of a. and b. is 100, thereby providing a mixture, and wherein the mixture is thereafter subjected to ultrasonic vibration at an intensity and for a period of time sufficient to form a pre-emulsion, followed by addition of a free radical initiator, and allowing the polymerization to proceed to a desired end point.

In one embodiment, the mixture is stirred while the initiator is being added and/or during the reaction period referred to above (i.e., the allowance of the polymerization to proceed to a desired end point). In one embodiment, the stirring is conducted mechanically within a range of about 100 to about 600 revolutions per minute (rpm).

The fluorine-free monoethylenically-unsaturated monomers referred to above are those acrylic and vinyl species generally utilized in the emulsion polymerization art such as (meth)acrylic esters, vinyl esters, and other vinyl-functional monomers. As defined, these monoethylenically-unsaturated monomers are devoid of fluorine atoms. In one embodiment, the fluorine-free monoethylenically-unsaturated monomer is chosen from compounds of the formula (A)

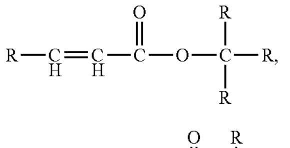

and (B)

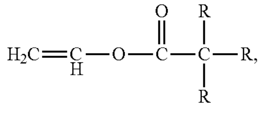

wherein each R is independently chosen from hydrogen or an alkyl group of up to 18 carbon atoms.

Compounds of Formula (A) will be recognized as representing acrylates and (alkyl)acrylates and compounds of Formula (B) will be recognized as representing certain vinyl compounds, i.e., vinyl esters.

In another embodiment, the fluorine-free monoethylenically-unsaturated monomer is chosen from compounds having an olefinic double bond, in certain cases attached directly attached to an aromatic ring. Examples of such compounds are styrene and α-methyl styrene. Alternatively, the olefinic double bond may be substituted with an alkoxycarbonyl group such as the case with di-n-butyl maleate. In other embodiments, the fluorine-free monoethylenically-unsaturated monomer may be those vinyl and acrylate compounds having one or more nitrogen atoms, such as hydroxyethyl acrylamide.

In another embodiment, the fluorine-free monoethylenically-unsaturated monomer is chosen from vinyl acetate, vinyl butyrate, vinyl caprylate, and $C_1$-$C_{18}$ alkyl (meth) acrylates.

In another embodiment, the fluorine-free monoethylenically-unsaturated monomer is chosen from $C_1$-$C_6$ alkyl acrylates.

In one embodiment, the fluorine-free monoethylenically-unsaturated monomer is chosen from methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, alkyl crotonates, vinyl acetate, vinyl caprylate, di-n-butyl maleate, di-octylmaleate, hydroxyethyl acrylamide, hydroxypropyl methyl acrylamide, and the like.

In another embodiment, the fluorine-free monoethylenically-unsaturated monomer is chosen from vinyl acetate, vinyl butyrate, vinyl caprylate, and $C_1$-$C_{18}$ alkyl (meth) acrylates. In a further embodiment, the monoethylenically-unsaturated monomer is chosen from $C_1$-$C_6$ alkyl acrylates. In a further embodiment, the monoethylenically-unsaturated monomer is chosen from ethyl acrylate and butyl acrylate.

In other embodiments, the fluorine-free monoethylenically-unsaturated monomers are also devoid of other halogen atoms, such as chloro, bronco, or iodo.

In one embodiment, the fluorine-containing monoethylenically-unsaturated monomer has the formula

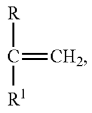

wherein R is chosen from hydrogen or an alkyl group of up to 18 carbon atoms, and $R^1$ is a group of the formula:

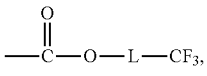

wherein L is a divalent organic linking group having from 1 to 20 carbon atoms, and wherein the monomer comprises at least 8, and up to about 32 fluorine atoms.

As used herein, the term "divalent organic linking group" describes a divalent group having carbon, hydrogen, and fluorine atoms and optionally one or more heteroatoms chosen from oxygen, sulfur and nitrogen.

In one embodiment, the fluorine-containing monomer is chosen from a perfluoro($C_1$-$C_{14}$ alkyl) ($C_1$-$C_6$)alkylacrylates and perfluoro(aryl)($C_1$-$C_6$ alkyl)acrylates.

In another embodiment, the fluorine-containing monoethylenically-unsaturated monomer is a perfluorinated alkene having one olefinic (i.e., double bond).

In another embodiment, the fluorine-containing monomer has the formula

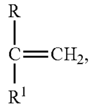

wherein R is chosen from hydrogen or an alkyl group of up to 18 carbon atoms, and $R^1$ is chosen from groups of the formulae:

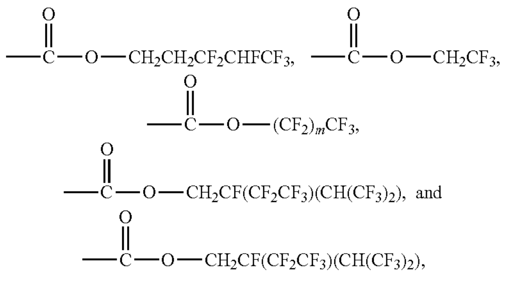

and wherein m is 3, 5, 7, 9, 11, 13, or 15.

In another embodiment, the fluorine-containing monomer is chosen from one or more of perfluorooctyl ethylene, perfluorononyl ethylene, perfluorotetradecyl ethylene, perfluorohexadecyl ethylene, perfluoroalkyl ethylene, perfluorooctyl ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorotetradecyl ethyl methacrylate, perfluorononyl ethyl methacrylate, perfluorododecyl ethyl methacrylate, perfluorohexadecyl ethyl methacrylate, perfluoroalkyl ethyl methacrylate, and the like. Exemplary fluorine-containing monoethylenically-unsaturated monomers are set forth in the table below.

| Chemical Name | Chemical Abstract No. (CAS No.) |
|---|---|
| 1H, 1H, 2H-heptadecafluoro-l-decene | 21652-58-4 |
| Perfluorodecyl ethylene | 30389-25-4 |
| (perfluorododecyl)ethylene | 67103-05-3 |
| 1H, 1H, 2H, 2H-heptadecafluorodecyl methacrylate | 1996-88-9 |
| 1H, 1H, 2H, 2H-heptadecafluorodecyl acrylate | 27905-45-9 |
| 1, 1, 2, 2-tetrahydroperfluorotetradecyl acrylate | 34395-24-9 |
| 1,1,2, 2-tetrahydroperfluorododecyl methacrylate | 2144-54-9 |
| 2-(perfluoroalkyl)ethyl methacrylate | 65530-66-7 |
| Perfluoroalkyl ethyl acrylate | 65605-70-1 |
| Perfluoroalkyl ethylene | 97659-47-4 |

In still another embodiment, the fluorine-containing monoethylenically-unsaturated monomer is (perfluorooctyl) ethyl acrylate.

In other embodiments, the fluorine-containing monoethylenically-unsaturated monomers are devoid of other halogen atoms, such as chloro, bromo, or iodo. Additionally, in other embodiments, the fluorine-containing monoethylenically-unsaturated monomers and the fluorine-free monoethylenically-unsaturated monomers of the present disclosure are devoid of other halogen atoms, such as chloro, bromo, or iodo.

In this process, suitable surfactants (i.e., emulsifiers) are those categorized as anionic, cationic, and nonionic surfactants. In one embodiment, the process utilizes at least one cationic surfactant and at least one nonionic surfactant. In general, these surfactants exhibit a hydrophilic-lipophilic balance (HLB) range of about 14 to about 40. Advantageously, the process of the disclosure may exclusively utilize fluorine-free surfactants, thus providing a fluoropolymer emulsion which is free of fluorine-containing surfactants. In other embodiments, the total weight of surfactants utilized in the process of the disclosure may comprise less than 5, less than 3, or less than 1 weight percent total of fluorine-containing surfactants.

Cationic surfactants are essentially quaternary compounds with at least one positively-charged surface active moiety, for example, benzalkonium. In one embodiment, the cationic surfactant is chosen from $C_8$-$C_{18}$ ammonium bromides and chlorides. The "$C_8$-$C_{18}$" modifier refers the number of carbon atoms in the surfactant and may include aliphatic and aromatic moieties. In another embodiment, the cationic surfactant is chosen from $C_{12}$-$C_{18}$ ammonium bromides and chlorides.

Exemplary cationic surfactants include, but are not limited to, cetyl trimethylammonium bromide (CTAB) (also known as hexadecyltrimethyl ammonium bromide), hexadecyltrimethyl ammonium chloride (CTAC), tetraethylammonium bromide, tetraethylammonium chloride, trimethyloctadecyl ammonium bromide, trimethyloctadecyl ammonium chloride, hexadecyltrimethylammonium bromide, dodecyltrimethylammonium chloride, and the like.

Anionic surfactants are generally surfactants which are characterized by a negatively charged hydrophilic polar group. Exemplary anionic surfactants include sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, disodium ethoxylated nonylphenol half ester of sulfosuccinic acid, disodium n-octyldecyl sulfosuccinate, and sodium dioctyl sulfosuccinate.

Exemplary nonionic surfactants include PolyFox PF-159 (OMNOVA Solutions), polyethylene glycol) ("PEG"), poly (propylene glycol) ("PPG"), ethylene oxide/propylene oxide block copolymers such as Pluronic F-127 (BASF), a polysorbate polyoxyethylene (20) sorbitan monooleate (Tween™ 80)(Croda Americas), polyoxyethylene (20) sorbitan monostearate (Tween™ 60), polyoxyethylene (20) sorbitan monopalmitate (Tween™ 40), polyoxyethylene (20) sorbitan monolaurate (Tween™ 20)), polyoxypropylene/polyoxyethylene block copolymers (e.g., Pluronic L31, Plutonic 31R1, Pluronic 25R2 and Pluronic 25R4), polyoxyethylene glycol octylphenol ethers, polyoxyethylene glycol alkylphenol ethers, and combinations thereof.

As noted above, the reaction mixture comprises greater than 60 to about 100 weight percent of a fluorine-containing monoethylenically-unsaturated monomer, and less than 40 weight percent of a fluorine-free monoethylenically-unsaturated monomer. Within this range, the particular proportions of both monomers, as well as their identities can be advantageously chosen so as to maximize the solubility of the fluorine-containing monoethylenically-unsaturated monomer(s) in aqueous solutions. In one embodiment, the fluorine-containing monoethylenically unsaturated monomer is present in about 80 weight percent to about 95 weight percent and the monoethylenically-unsaturated monomer is present in about 5 weight percent to about 20 weight percent, based on the total weight of monomers utilized.

The fluoropolymer emulsions of the disclosure show superior stability for extended periods of time as illustrated in the Examples below. Accordingly, in a further aspect, the disclosure provides the fluoropolymer emulsions prepared by the methodology of the disclosure. In a further aspect, the disclosure provides a fluoropolymer emulsion which exhibits no visually observable gelatinous material or precipitated material upon storage for up to one week. In a further embodiment, the fluoropolymer emulsions of the disclosure have an average particle size of about 100 to about 200 nm.

The resulting aqueous emulsion polymer may then be diluted with a mixture of water and an aprotic solvent such as a $C_1$-$C_6$ alcohol, for example, isopropanol. The dilution mixture can, in one embodiment, be about 40 to 100% by weight water and about 0 to about 60% by weight of the aprotic solvent (such as isopropanol). The diluted emulsion polymer product can then be applied to, for example, a polymeric woven or nonwoven material by simple dipping or spraying in order to coat at least a portion of the surface of the fibers comprising the polymeric nonwoven material. The optimum relative amounts of the dilution mixture can be determined empirically by optimization of the efficiency in coating the particular polymeric nonwoven material with the emulsion polymer product. The so-coated material is allowed to dry, for example at a temperature of about 90° C. to about 180° C., for a period of about 30 seconds to 10 minutes.

Exemplary polymeric woven and nonwoven materials can comprise polymers such as polyolefins, polyamides, polyimides, polysulfones, polyether-sulfones, polyarylsulfone-polyamides, polyacrylates, polyesters, nylons, celluloses, cellulose esters, polycarbonates, or combinations thereof. Exemplary polyolefins include polyethylene (PE), polypropylene (PP), polymethylpentene (PMP), polybutene (PB), polyisobutylene (PIB), and copolymers of two or more of ethylene, propylene, and butylene. Additionally, the polymeric nonwoven materials can comprise polymers such as halogenated polymers. Exemplary halogenated polymers include polytetrafluoroethylene (PTFE), polychlorotrifluoro-ethylene (PCTFE), fluorinated ethylene polymer (FEP), polyhexafluoropropylene, and polyvinylidene fluoride (PVDF). In a further particular embodiment, the polymeric nonwoven material includes ultra-high molecular weight polyethylene (UPE). UPE filter materials are typically formed from a resin having a molecular weight (weight average molecular weight) greater than about $1\times10^6$ Daltons (Da), such as in the range of about $1\times10^6$-$9\times10^6$ Da, or $1.5\times10^6$-$9\times10^6$ Da.

A "filter" as referred to herein refers to an article having a structure that includes filter material such as the polymeric nonwoven material disclosed herein. The filter can be in any desired form suitable for a filtering application. Material that forms the filter can be a structural component of a filter itself and that provides the filter with a desired architecture. The filter is sufficiently porous for a gas to pass through, while enabling sufficient residence time for the desired filtration operation, and can be of any desired shape or configuration. The filters of the invention are thus useful both as hydrophobic filters as well as oleophobic filters, particularly in the filtration of gases such as air. Accordingly, the filters of the invention are particularly useful as vent filters. The fluoropolymer coating of these nonwoven materials render the underlying nonwoven material more hydrophobic and oleophobic without significant loss of gas permeability.

In one embodiment, the filter materials of the disclosure, having at least a partial coating of a fluoropolymer thereon, exhibits an oil rating according to AATCC Test method 1997 of greater than about 6. In another embodiment, the filter material an oil rating according to AATCC Test method 228-1997 of about 7 to about 8.

The air flux was measured as the passage of air at a rate of liters (L) per minute per for an effective membrane area of 0.5024 square centimeter test sample, at a pressure of 10 KPa. A Rotameter flowmeter was utilized to measure the resulting air flow.

EXAMPLES

Example 1

A 42.75 g sample of perfluorooctane ethyl acrylate, 2.25 g of butyl acrylate, 100 g deionized water, and 1 g of sodium dodecyl sulfate were added to a beaker, and the mixture was then pre-emulsified by an ultrasonic processor at 10% intensity for 60 minutes to obtain the colorless and transparent emulsion. Afterwards, the emulsion was transferred to a bench-scale reactor with nitrogen inlet tube, thermometer and mechanical stirrer. After addition of 0.15 g ammonium persulfate and with a flow of the nitrogen, the reactor was heated to 70° C. with stirring at 150 rpm, and the polymerization product was obtained after 16 h. Subsequently, the fluoropolymer emulsion was diluted with a diluent consisting of 50 weight percent water and 50 weight percent isopropyl alcohol to prepare the oleophobic fluoropolymer treatment emulsion utilized below with a weight concentration of 3%.

A piece of poly(ethylene) (PET) nonwoven fabric was prepared. After soaking the PET nonwoven fabric in the diluted fluoropolymer emulsion for 1 min, it was removed from the emulsion and drained of excess water. The coated fabric was then placed in an oven at 130° C. for 5 minutes to obtain a fluoropolymer-treated PET nonwoven fabric. See Table 1, below, for before and after treatment performance for oil rating, air flux, and air flux loss rate (after coating the nonwoven fabric).

TABLE 1

Data comparison before and after oleophobic treatment of PET nonwoven.

| Sample | Oil rating | Air flux (L/min) | Air flux loss rate |
|---|---|---|---|
| Before oleophobic treatment | 0 | 3 | / |
| Example 1 | 8 | 2.7 | 10% |

Example 2

A 10 g sample of perfluorooctane ethyl acrylate, 10 g of methyl methacrylate, 100 g of deionized water, and 3 g of sodium dodecyl sulfate were added to a beaker, and the mixture was pre-emulsified by an ultrasonic processor at 70% intensity for 3 minutes to obtain a light blue emulsion. The emulsion was transferred to a reactor with a nitrogen inlet tube, thermometer, and mechanical stirrer. After adding 0.2 g of ammonium persulfate and with a flow of the nitrogen, the reactor was heated to 70° C. with stirring at 400 rpm, and the polymerization product was obtained after 8 h. The fluoropolymer emulsion was diluted with a diluent consisting of 90 weight percent water and 10 weight percent isopropyl alcohol to prepare the oleophobic fluoropolymer treatment emulsion utilized below with a weight concentration of 3%.

According to the method in Example 1, a PET nonwoven fabric was treated with the oleophobic fluoropolymer emulsion.

Comparative Example 1

A 10 g sample of perfluorooctane ethyl acrylate, 10 g of methyl methacrylate, 100 g of deionized water, and 3 g sodium dodecyl sulfate were added into a beaker, and the mixture was pre-emulsified by mechanical stirring to obtain the emulsion, which was milky white. The emulsion was then transferred to a reactor with a nitrogen inlet tube, thermometer, and mechanical stirrer. After the addition of 0.2 g of ammonium persulfate and with a flow of the nitrogen, the reactor was heated to 70° C. with stirring at 400 rpm, and the polymerization product was obtained 8 hours later. The fluoropolymer emulsion was diluted with a diluent consisting of 90 weight percent water and 10 weight percent isopropyl alcohol to prepare the oleophobic fluoropolymer treatment emulsion with a weight concentration of 3%.

According to the method in Example 1, a PET nonwoven fabric was treated with the oleophobic fluoropolymer emulsion described above.

As shown below in Table 2, the fluoropolymer emulsions of the disclosure show markedly improved performance in the stability of the emulsion, as well as excellent oleophobic modification of the nonwoven fiber.

TABLE 2

Comparison of the effects of EXAMPLES 1 and 2 and the COMPARATIVE EXAMPLE

| Sample | Weight proportion of fluorinated monomer | Oleophobic level | Stability of emulsion - comments |
|---|---|---|---|
| EXAMPLE 1 | 95% | 8 | No gel was found at the end of the reaction, and no precipitation was found after standing for a week. |
| EXAMPLE 2 | 50% | 7 | No gel was found at the end of the reaction, and no precipitation was found after standing for a week. |
| COMPARATIVE EXAMPLE 1 | 50% | 0 | A small amount of gel was found on the stirrer at the end of the reaction, and precipitation was found after standing for a week. |

Samples 1 through 4 in Table 3 below illustrate the effect of increasing the weight proportion of fluorine-containing monoethylenically-unsaturated monomer in the emulsion polymerization, and shows in general that the oleophobic level of coated nonwoven materials generally increases with an increase in fluorine atom proportion. Additionally, it is noted above that the emulsions remained quite stable after a week of storage, as no gelatinous material or precipitated material was observed.

General Procedure for Preparation of Coated Nonwoven Material:

The fluoropolymer emulsion was diluted with a diluent consisting of 90 weight percent water and 10 weight percent isopropyl alcohol to prepare the oleophobic fluoropolymer treatment emulsion with a weight concentration of 2%.

A piece of poly(ethylene) (PET) nonwoven fabric was prepared. After soaking the PET nonwoven fabric in the diluted fluoropolymer emulsion for 1 min, it was removed from the emulsion and drained of excess water. The coated fabric was then placed in an oven at 130° C. for 5 minutes to obtain a fluoropolymer-treated PET nonwoven fabric.

TABLE 3

Oleophobic modification effect of fluoropolymer emulsions with different fluorinated monomer for PET nonwovens.

| Sample | Weight proportion of fluorinated monomer | Oleophobic level | Stability of emulsion - comments | Yield | Particle Size (By DLS method*) |
|---|---|---|---|---|---|
| 1 | 40% | 6 | No gel was found at the end of the reaction, and no precipitation was found after standing for a week. | >95% | 100~200 nm |
| 2 | 50% | 7 | | | |
| 3 | 60% | 7 | | | |
| 4 | >75% | 8 | | | |

*Dynamic Light Scattering

Aspects

In a first aspect, the disclosure provides a process for preparing a fluoropolymer emulsion, comprising the aqueous free-radical polymerization of monoethylenically-unsaturated monomers, by combining components comprising:

a. greater than 60 to about 100 weight percent of a fluorine-containing monoethylenically-unsaturated monomer;

b. less than 40 to about 0 weight percent of a fluorine-free monoethylenically-unsaturated monomer; and c. a surfactant, wherein the total of a. and b. is 100 weight percent, thereby providing a mixture, and wherein the mixture is subjected to ultrasonic vibration at an intensity and for a period of time sufficient to form a pre-emulsion, followed by subjecting the mixture to free-radical polymerization conditions and allowing the polymerization to proceed to a desired end point.

In a second aspect, the disclosure provides the process of the first aspect, wherein the free-radical polymerization conditions comprise the addition of a free radical initiator to the mixture.

In a third aspect, the disclosure provides the process of the second aspect, wherein the pre-emulsion is stirred during addition of the free radical initiator.

In a fourth aspect, the disclosure provides the process of any one of the first through third aspects, wherein the fluorine containing monomer is chosen from ($C_1$-$C_{14}$ alkyl) acrylates having about 8 to about 32 fluorine atoms, and vinyl compounds having about 8 to about 32 fluorine atoms.

In a fifth aspect, the disclosure provides the process of the first or second aspects, wherein a. is present in about 80 weight percent to about 95 weight percent and b. is present in about 5 weight percent to about 20 weight percent.

In a sixth aspect, the disclosure provides the process of any one of the first through fifth aspects, wherein the fluorine-containing monoethylenically-unsaturated monomer has the formula

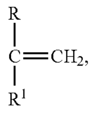

wherein R is chosen from hydrogen or an alkyl group of up to 18 carbon atoms, and $R^1$ is a group of the formula:

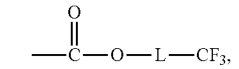

wherein L is a divalent organic linking group having from 1 to 20 carbon atoms, and wherein the monomer comprises at least 8, and up to about 32 fluorine atoms.

In a seventh aspect, the disclosure provides the process of any one of the first through sixth aspects, wherein the fluorine-containing monoethylenically-unsaturated monomer has the formula

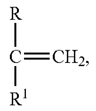

wherein R is chosen from hydrogen or an alkyl group of up to 18 carbon atoms, and $R^1$ is chosen from groups of the formulae:

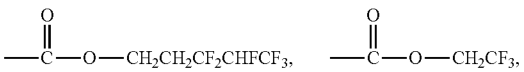

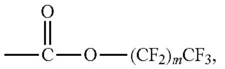

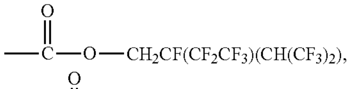 and

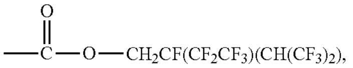

wherein m is 3, 5, 7, 9, 11, 13, or 15.

In an eighth aspect, the disclosure provides the process of any one of the first through the seventh aspects, wherein the fluorine-containing monoethylenically-unsaturated monomer is chosen from a perfluoro($C_1$-$C_{14}$ alkyl) ($C_1$-$C_6$)alkylacrylate and perfluoro(aryl)($C_1$-$C_6$ alkyl)acrylate.

In a ninth aspect, the disclosure provides the process of any one of the first through the eighth aspects, wherein the fluorine-containing monoethylenically-unsaturated monomer is chosen from one or more of perfluorooctyl ethylene, perfluorononyl ethylene, perfluorotetradecyl ethylene, perfluorohexadecyl ethylene, perfluoroalkyl ethylene, perfluorooctyl ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorotetradecyl ethyl methacrylate, perfluorononyl ethyl methacrylate, perfluorododecyl ethyl methacrylate, perfluorohexadecyl ethyl methacrylate, and perfluoroalkyl ethyl methacrylate.

In a tenth aspect, the disclosure provides the process of any one of the first through the ninth aspects, wherein the fluorine-containing monoethylenically-unsaturated monomer is (perfluorooctyl) ethyl acrylate.

In an eleventh aspect, the disclosure provides the process of any one of the first through the tenth aspects, wherein the fluorine-free monoethylenically-unsaturated monomer is chosen from compounds of the formula

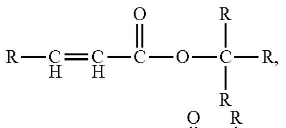

and

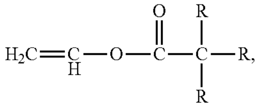

wherein each R is independently chosen from hydrogen or an alkyl group of up to 18 carbon atoms.

In a twelfth aspect, the disclosure provides the process of any one of the first through the eleventh aspects, wherein the fluorine-free monoethylenically-unsaturated monomer is chosen from vinyl acetate, vinyl butyrate, vinyl caprylate, and $C_1$-$C_{18}$ alkyl (meth)acrylates.

In a thirteenth aspect, the disclosure provides the process of any one of the first through the twelfth aspects, wherein the fluorine-free monoethylenically-unsaturated monomer is chosen from $C_1$-$C_6$ alkyl acrylates.

In a fourteenth aspect, the disclosure provides the process of any one of the first through the thirteenth aspects, wherein the ultrasonic vibration is at a frequency of about 20,000 hertz to about 100,000 hertz.

In a fifteenth aspect, the disclosure provides the process of any one of the first through the fourteenth aspects, wherein the surfactant has a hydrophobic lipophilic balance (HLB) of from about 14 to about 40.

In a sixteenth aspect, the disclosure provides the process of any one of the first tli rough the fifteenth aspects, wherein the surfactant is devoid of fluorine atoms.

In a seventeenth aspect, the disclosure provides the process of any one of the first through the sixteenth aspects, wherein the surfactant is present in about 1 to about 5 weight percent, based on the total weight of a. and b.

In an eighteenth aspect, the disclosure provides the process of any one of the first through the seventeenth aspects, wherein the surfactant is chosen from nonionic, anionic, and cationic surfactants.

In a nineteenth aspect, the disclosure provides the process of any one of the first through the eighteenth aspects, wherein the surfactant is a mixture of at least one nonionic surfactant and at least one cationic surfactant.

In a twentieth aspect, the disclosure provides the process of any one of the first through nineteenth aspects, wherein the surfactant is chosen from sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, disodium ethoxylated nonylphenol half ester of sulfosuccinic acid, disodium n-octyldecyl sulfosuccinate, sodium dioctyl sulfosuccinate, and $C_8$-$C_{18}$ quaternary ammonium bromides and chlorides.

In a twenty-first aspect, the disclosure provides the process of any one of the first through the twentieth aspects, wherein the surfactant is chosen from trimethyloctadecyl ammonium bromide and trimethyloctadecyl ammonium chloride.

In a twenty-second aspect, the disclosure provides the process of any one of the first through twentieth aspects, wherein the surfactant is a non-fluorine-containing reactant.

In a twenty-third aspect, the disclosure provides a fluoropolymer emulsion which exhibits no visually observable gelatinous material or precipitated material upon storage for up to one week, and wherein the emulsion contains less than 5 weight percent of fluorinated surfactants, based on the total weight of surfactants.

In a twenty-fourth aspect, the disclosure provides the emulsion of the twenty-third aspect, wherein the emulsion comprises particles having an average particle size of about 100 to about 200 nm.

In a twenty-fifth aspect, the disclosure provides a filter material comprising a woven or nonwoven substrate, the substrate having at least a partial coating of a fluoropolymer thereon, wherein the filter material exhibits an oil rating according to AATCC Test method 228-1997 of greater than about 6.

In a twenty-sixth aspect, the disclosure provides the filter material of the twenty-fifth aspect, wherein the filter material exhibits an air flux loss rate, when compared to uncoated filter material, of no greater than about 15%.

In a twenty-seventh aspect, the disclosure provides a filter material having at least a partial coating of a fluoropolymer emulsion made according to the first aspect thereon, wherein the filter exhibits an oil rating according to AATCC Test method 2284997 of greater than about 6.

In a twenty-eighth aspect, the disclosure provides the filter material of the twenty-fifth or twenty-seventh aspect, wherein the filter material exhibits an oil rating according to AATCC Test method 228-1997 of about 7 to about 8.

In a twenty-ninth aspect, the disclosure provides the filter material of the twenty-fifth or twenty-seventh aspect, wherein the filter material comprises a polymer chosen from polyolefins, fluorinated polyolefins, polyamides, polyimides, polysulfones, polyether-sulfones, polyarylsulfone-polyamides, polyacrylates, polyesters, nylons, celluloses, cellulose esters, polycarbonates, and combinations thereof.

In a thirtieth aspect, the disclosure provides a filter comprising the filter material of the twenty-fifth, twenty-sixth, twenty-seventh, twenty-eighth, or twenty-ninth aspect.

In a thirty-first aspect, the disclosure provides a method for purifying a gas, which comprises passing a gas in need of purification though the filter of the thirtieth aspect.

In a thirty-second aspect, the disclosure provides the filter material of any one of the twenty-fifth through twenty-ninth aspects, wherein the filter material contains less than five, less than three, or less than one weight percent of fluorinated surfactants, based on the total weight percent of surfactants present.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A process for preparing a fluoropolymer emulsion, comprising the aqueous free-radical polymerization of monoethylenically-unsaturated monomers, by combining components comprising:

a. greater than 60 to about 100 weight percent of a fluorine-containing monoethylenically-unsaturated monomer;

b. less than 40 to about 0 weight percent of a fluorine-free monoethylenically-unsaturated monomer, wherein fluorine-containing monoethylenically-unsaturated monomer and the fluorine-free monoethylenically-unsaturated monomer are devoid of other halogen atoms; and c. a surfactant, wherein the total of a. and b. is 100 weight percent, thereby providing a mixture, and wherein the mixture is subjected to ultrasonic vibration at an intensity and for a period of time sufficient to form a pre-emulsion, followed by subjecting the mixture to free-radical polymerization conditions and allowing the polymerization to proceed to a desired end point.

2. The process of claim 1, wherein the fluorine-containing monoethylenically-unsaturated monomer is chosen from ($C_1$-$C_{14}$ alkyl) acrylates having about 8 to about 32 fluorine atoms, and vinyl compounds having about 8 to about 32 fluorine atoms.

3. The process of claim 1, wherein a. is present in about 80 weight percent to about 95 weight percent and b. is present in about 5 weight percent to about 20 weight percent.

4. The process of claim 1, wherein the fluorine-containing monoethylenically-unsaturated monomer has the formula

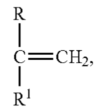

wherein R is chosen from hydrogen or an alkyl group of up to 18 carbon atoms, and $R^1$ is a group of the formula:

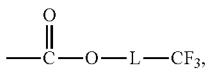

wherein L is a divalent organic linking group having from 1 to 20 carbon atoms, and wherein the monomer comprises at least 8, and up to about 32 fluorine atoms.

5. The process of claim 1, wherein the fluorine containing monomer has the formula

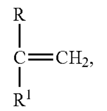

wherein R is chosen from hydrogen or an alkyl group of up to 18 carbon atoms, and $R^1$ is chosen from groups of the formulae:

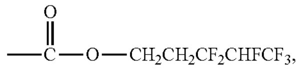

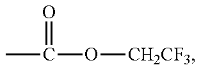

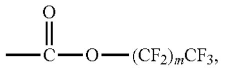

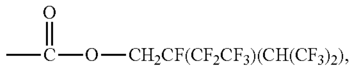

and

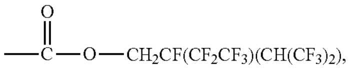

wherein m is 3, 5, 7, 9, 11, 13, or 15.

6. The process of claim 1, wherein the fluorine-containing monoethylenically-unsaturated monomer is chosen from a perfluoro($C_1$-$C_{14}$ alkyl) ($C_1$-$C_6$)alkylacrylate and perfluoro (aryl)($C_1$-$C_6$ alkyl) acrylate.

7. The process of claim 1, wherein the fluorine-containing monoethylenically-unsaturated monomer is chosen from one or more of perfluorooctyl ethylene, perfluorononyl ethylene, perfluorotetradecyl ethylene, perfluorohexadecyl ethylene, perfluoroalkyl ethylene, perfluorooctyl ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorotetradecyl ethyl methacrylate, perfluorononyl ethyl methacrylate, perfluorododecyl ethyl methacrylate, perfluorohexadecyl ethyl methacrylate, and perfluoroalkyl ethyl methacrylate.

8. The process of claim 1, wherein the fluorine-free monoethylenically-unsaturated monomer is chosen from compounds of the formula

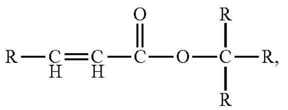

and

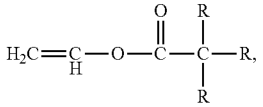

wherein each R is independently chosen from hydrogen or an alkyl group of up to 18 carbon atoms.

9. The process of claim 1, wherein the fluorine-free monoethylenically-unsaturated monomer is chosen from vinyl acetate, vinyl butyrate, vinyl caprylate, and $C_1$-$C_{18}$ alkyl (meth) acrylates.

10. The process of claim 1, wherein the fluorine-free monoethylenically-unsaturated monomer is chosen from $C_1$-$C_6$ alkyl acrylates.

11. The process of claim 1, wherein the ultrasonic vibration is at a frequency of about 20,000 hertz to about 100,000 hertz.

12. The process of claim 1, wherein the surfactant has a hydrophobic lipophilic balance (HLB) of from about 14 to about 40.

13. The process of claim 1, wherein the surfactant is devoid of fluorine atoms.

14. The process of claim 1, wherein the surfactant is present in about 1 to about 5 weight percent, based on the total weight of a. and b.

15. The process of claim 1, wherein the surfactant is a mixture of at least one nonionic surfactant and at least one cationic surfactant.

16. The process of claim 1, wherein the surfactant is chosen from sodium lauryl sulfate, sodium octylphenol glycolether sulfate, sodium dodecylbenzene sulfonate, sodium lauryldiglycol sulfate, and ammonium tritertiary-butyl phenol and penta-and octa-glycol sulfonates, disodium ethoxylated nonylphenol half ester of sulfosuccinic acid, disodium n-octyldecyl sulfosuccinate, sodium dioctyl sulfosuccinate, and $C_8$-$C_{18}$ quaternary ammonium bromides and chlorides.

17. The process of claim 1, wherein the surfactant is chosen from trimethyloctadecyl ammonium bromide and trimethyloctadecyl ammonium chloride.

* * * * *